(12) United States Patent
Gotschlich

(10) Patent No.: US 9,145,034 B2
(45) Date of Patent: Sep. 29, 2015

(54) INDIRECT TIRE PRESSURE MONITORING SYSTEMS AND METHODS

(71) Applicant: Infineon Technologies AG, Neubiberg (DE)

(72) Inventor: Martin Gotschlich, Markt Schwaben (DE)

(73) Assignee: INFINEON TECHNOLOGIES AG, Neubiberg (DE)

( * ) Notice: Subject to any disclaimer, the term of this patent is extended or adjusted under 35 U.S.C. 154(b) by 0 days.

(21) Appl. No.: 14/071,570

(22) Filed: Nov. 4, 2013

(65) Prior Publication Data

US 2014/0060170 A1    Mar. 6, 2014

Related U.S. Application Data

(63) Continuation of application No. 13/284,043, filed on Oct. 28, 2011, now Pat. No. 8,573,045.

(51) Int. Cl.
*B60C 23/02* (2006.01)
*B60C 23/04* (2006.01)
*B60C 23/06* (2006.01)

(52) U.S. Cl.
CPC ............. *B60C 23/02* (2013.01); *B60C 23/0408* (2013.01); *B60C 23/062* (2013.01)

(58) Field of Classification Search
USPC ................................................ 73/146–146.8
See application file for complete search history.

(56) References Cited

U.S. PATENT DOCUMENTS

| RE28,775 | E | * | 4/1976 | Tarpinian et al. ................ 73/146 |
|---|---|---|---|---|
| 8,397,559 | B2 | * | 3/2013 | Fischer et al. ............... 73/146.5 |
| 8,868,290 | B2 | * | 10/2014 | Hammerschmidt ......... 701/32.7 |
| 2004/0178897 | A1 | | 9/2004 | Fennel et al. |
| 2005/0085987 | A1 | * | 4/2005 | Yokota et al. .................... 701/80 |
| 2006/0220811 | A1 | * | 10/2006 | Griesser et al. ............... 340/442 |
| 2007/0000316 | A1 | * | 1/2007 | Lauer et al. .................. 73/146.4 |
| 2007/0100531 | A1 | | 5/2007 | Kim |
| 2008/0140276 | A1 | * | 6/2008 | Griesser et al. ................. 701/29 |
| 2008/0223124 | A1 | * | 9/2008 | Irth et al. ......................... 73/146 |

(Continued)

FOREIGN PATENT DOCUMENTS

| CN | 201881835 | 6/2011 |
|---|---|---|
| GB | 2 344 232 | 5/2000 |

(Continued)

OTHER PUBLICATIONS

Office Action, State Intellectual Property Office of the People's Republic of China, Dated: Aug. 22, 2014 (with English translation).

*Primary Examiner* — Andre Allen
(74) *Attorney, Agent, or Firm* — SpryIP, LLC

(57) ABSTRACT

Embodiments relate to indirect tire pressure monitoring systems (TPMSs) and methods that utilize anti-lock braking system (ABS) signals. In embodiments, information from the ABS Hall signal is obtained in analog form, before pulse forming. The information can be analyzed for a resonance frequency within the ABS sensor. In some embodiments, the digitized information can be modulated onto the conventional ABS wheel speed clock signal for transmission to and analysis by the indirect TPMS electronic control unit (ECU). According to embodiments, additional information about higher-order harmonics of the wheel rotation can be provided to the TPMS ECU, which can then calculate a more accurate estimation of tire pressure while reducing warning latency.

10 Claims, 2 Drawing Sheets

(56) References Cited

U.S. PATENT DOCUMENTS

2008/0243423 A1* 10/2008 Irth et al. .................. 702/138
2011/0246101 A1* 10/2011 Araki et al. ................. 702/50
2013/0104640 A1* 5/2013 Gotschlich ................ 73/146.5

FOREIGN PATENT DOCUMENTS

| | | |
|---|---|---|
| JP | 20010021432 | 1/2001 |
| JP | 2002229114 | 8/2002 |
| WO | WO 2005072995 A1 * | 8/2005 |

* cited by examiner

INDIRECT TIRE PRESSURE MONITORING SYSTEMS AND METHODS

REFERENCE TO RELATED APPLICATIONS

This application is a continuation of U.S. application Ser. No. 13/284,043 filed on Oct. 28, 2011 and claims the benefit of the priority date of the above U.S. application, the contents of which are herein incorporated in its full entirety by reference.

TECHNICAL FIELD

The invention relates generally to indirect tire pressure monitoring and more particularly to the use of analog Hall signals from wheel speed sensors for indirect tire pressure monitoring.

BACKGROUND

There are two general approaches to monitoring the pressure in vehicle tires: direct and indirect. Direct tire pressure monitoring systems (TPMSs) typically comprise a wheel module having one or more sensors and electronics mounted in or to the tire to directly measure the tire's pressure and wirelessly transmit measurement data to the vehicle.

Indirect TPMSs generally utilize information from other vehicle sensors and/or systems to indirectly estimate a tire's pressure without TPMS sensors or electronics being located in the tire. Indirect TPMS is attractive because it can be more cost-efficient than direct TPMS. One conventional indirect TPMS uses wheel speed signals from the anti-lock brake system (ABS). For a typical passenger vehicle having four tires, the indirect TPMS compares the four wheel speed signals to determine whether a wheel is rotating faster because of a loss of pressure and related decreased diameter. One drawback to some of these indirect systems is that the systems cannot detect whether all wheels have lost pressure over time because the values are compared.

Further, the quality of the signals from the ABS or other vehicle system(s) is important for indirect TPMS. Conventional indirect TPMS typically use digital signals from the ABS representing the clock generated by a rotating pole wheel. The digital signals are derived from an analog Hall signal by detecting the minimum and maximum values of the signal and determining the zero-crossing points. Unfortunately, valuable information about resonance of the tire and higher-order harmonics on the clock signal is lost by using the derived digital signals. Conventional systems therefore must attempt to recover higher-order harmonics in the ABS clock signal, though with only limited performance results.

Therefore, there is a need for improved systems and methods for indirect tire pressure monitoring.

BRIEF DESCRIPTION OF THE DRAWINGS

The invention may be more completely understood in consideration of the following detailed description of various embodiments of the invention in connection with the accompanying drawings, in which.

Figure 1:
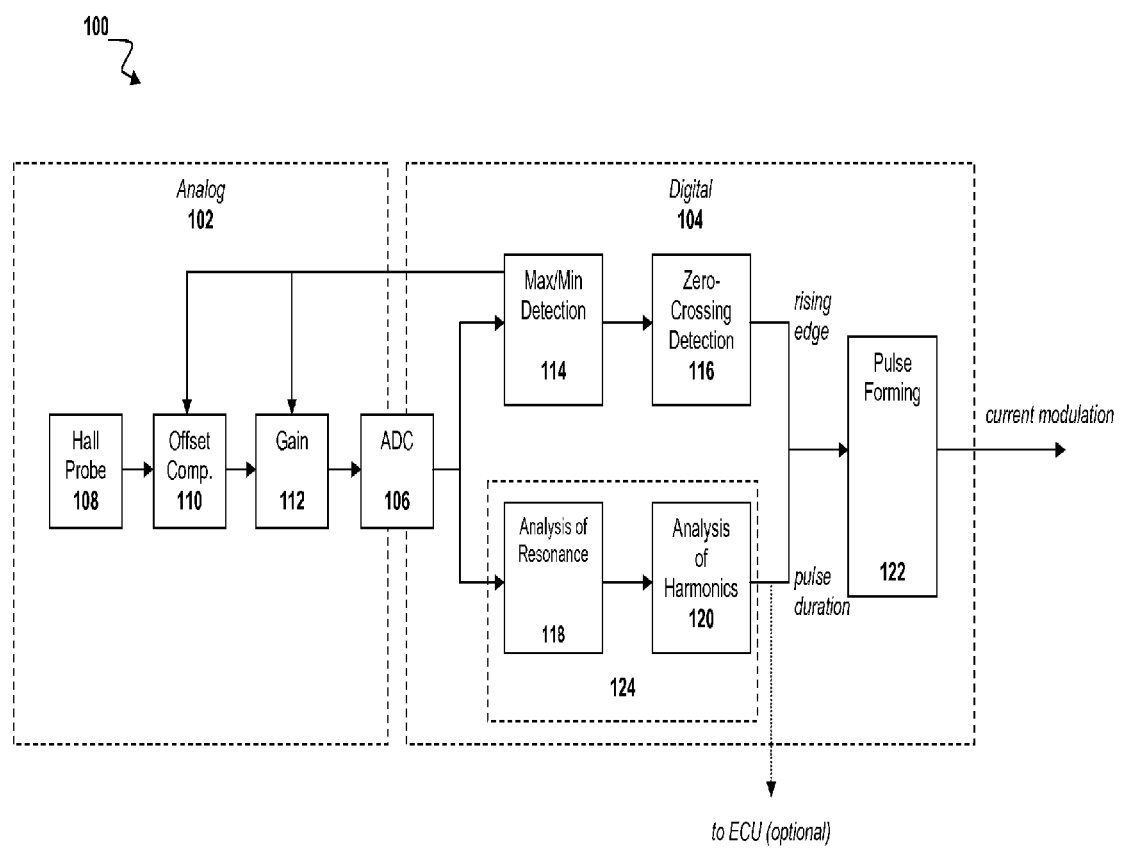
FIG. 1 is a block diagram of a system according to an embodiment.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

Embodiments relate to indirect tire pressure monitoring systems (TPMSs) and methods that utilize anti-lock braking system (ABS) signals. In embodiments, information from the ABS Hall signal is obtained in analog form, before pulse forming. The information can be analyzed for a resonance frequency within the ABS sensor. In some embodiments, the digitized information can be modulated onto the conventional ABS wheel speed clock signal for transmission to and analysis by the indirect TPMS electronic control unit (ECU). According to embodiments, additional information about higher-order harmonics of the wheel rotation can be provided to the TPMS ECU, which can then calculate a more accurate estimation of tire pressure while reducing warning latency, thereby providing a more robust system that balances provision of early warnings with false alarms.

Referring to FIG. 1, a block diagram of ABS sensor circuitry 100 is depicted. Circuitry 100 includes an analog portion 102 and a digital portion 104 coupled by an analog-to-digital (ADC) converter 106. Analog portion 102 comprises one or more Hall probes 108, offset compensation circuitry 110 and gain circuitry 112. Digital portion 104 comprises maximum/minimum detection circuitry 114, zero-crossing detection circuitry 116, frequency analysis circuitry 118, analysis of harmonics circuitry 120 and pulse forming circuitry 122. Frequency analysis circuitry 118 and analysis of harmonics circuitry 120 form part of an indirect TPMS 124.

The addition of frequency analysis circuitry 118, which in an embodiment comprises Fast Fourier Transform (FFT) circuitry, and analysis of harmonics circuitry 120 to ABS sensor circuitry 100 enables extraction of wheel speed and resonance frequency information as well additional information, for example information related to center frequency, Q-factor and higher-order resonances from the Hall signal, as compared to conventional indirect TPMS approaches. In general, wheel speed corresponds to the first order frequency of the signal, with the wheel speed corresponding to a duration between pulses. In one embodiment, there are about 48 pulses per rotation, which provides good granularity. Changes in these characteristics can then be analyzed to determine whether any are indicative of a change in the pressure of the tire.

For example, indirect TPMS 124 can detect a change in resonance frequency of a tire. A decrease of the resonance frequency could be indicative of a lower tire pressure in the tire.

Figure 2:
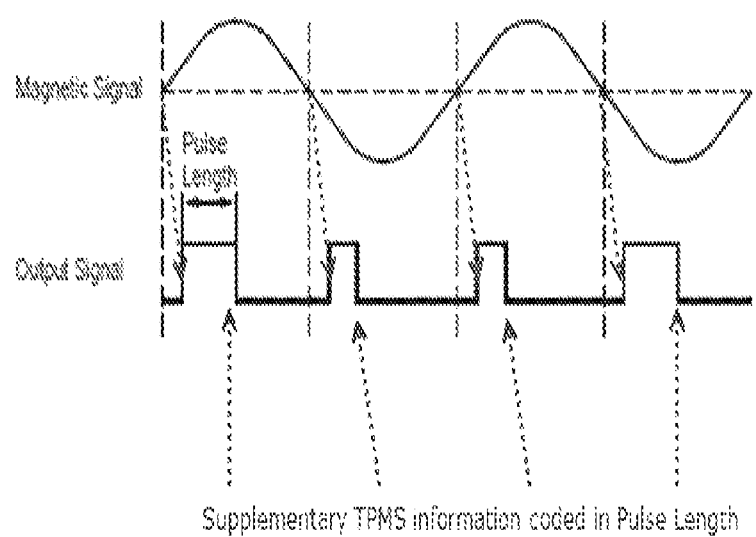
FIG. 2 is a signal modulation diagram according to an embodiment.

Information then can be transmitted from indirect TPMS 124 to a TPMS or vehicle ECU in several manners. In a first embodiment, information from indirect TPMS 124 is represented in a digital frame protocol format and is modulated onto the original ABS clock signal by adapting the pulse length to the state of the related bit of the frame. Thus, the ABS wheel speed signal is represented by the rising edge while the TPMS information is in the pulse duration of a sequence of pulses. Refer, for example, to FIG. 2. In another embodiment, a separate communication source, such as a wired or wireless connection, can be provided between indirect TPMS 124 and the ECU.

Other TPMS systems can use digital ABS sensor signals, but these systems are inferior to embodiments disclosed herein. The information used for the resonance analysis is embedded in the point-in-time of the slopes of the signal. Therefore, jitter errors in this signal are a serious source of disturbance for TPMS performance. This jitter can be considered to be a non-constant delay between a zero-crossing of the analog signal and slope of the digitized signal. This problem arises from the permanent adaptation in minimum/maximum detection and zero-crossing detection during operation. Therefore, this jitter error is disclosed in ABS sensor datasheets. Those implementing indirect TPMS seek low jitter, and use of the analog signal for indirect TPMS, as disclosed herein, makes moot the jitter issue, providing a significant advantage over conventional approaches.

Various embodiments of systems, devices and methods have been described herein. These embodiments are given only by way of example and are not intended to limit the scope of the invention. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the invention.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A sensor comprising:
sensing circuitry to sense a wheel speed;
an analog to digital converter coupled to the sensing circuitry to convert an analog signal into a digital signal;
frequency analysis circuitry to receive the digital signal from the analog to digital converter and to derive frequency information for indirect tire pressure monitoring;
transmission circuitry to transmit the frequency information for indirect tire pressure monitoring from the sensor to an electronic control unit;
detection circuitry to determine signal crossings and to generate a pulse signal based on signal crossings, and wherein the transmission circuitry is configured to modulate the frequency information into the pulse signal.

2. The sensor of claim 1, wherein the digital signal from the analog to digital converter is provided to the frequency analysis circuitry and the detection circuitry in parallel.

3. The sensor of claim 2, wherein the detection circuitry and the frequency analysis circuitry are arranged in parallel signal paths.

4. The sensor of claim 3, wherein the frequency analysis circuitry comprises at least Fourier Transformation circuitry.

5. A sensor comprising:
sensing circuitry to sense a wheel speed;
an analog to digital converter coupled to the sensing circuitry to convert an analog signal into a digital signal;
harmonics analysis circuitry to receive the digital signal from the analog to digital converter and to derive harmonics information for indirect TPMS;
transmission circuitry to transmit the harmonics information for indirect TPMS from the sensor to an electronic control unit;
detection circuitry to determine signal crossings and to generate a pulse signal based on signal crossings, and wherein the transmission circuitry is configured to modulate the harmonics information into the pulse signal.

6. The sensor of claim 5, wherein the detection circuitry and the harmonics analysis circuitry are arranged in parallel signal paths.

7. The sensor of claim 5, further comprising frequency analysis circuitry, wherein the harmonics analysis circuitry is coupled to the frequency analysis circuitry.

8. A system comprising:
a sensor to provide a wheel speed signal;
an electronic control unit to receive the wheel speed signal from the sensor;
an indirect tire pressure monitoring system (TPMS) to derive tire pressure information, wherein the sensor comprises at least a part of a digital TPMS analysis circuitry of the indirect TPMS;
detection circuitry to determine signal crossings and to generate a pulse signal based on signal crossings, and wherein the sensor further comprises transmission circuitry to modulate information generated by said part of the digital TPMS circuitry into the pulse signal.

9. The system of claim 8, wherein said part of the digital TPMS analysis circuitry includes a frequency analysis circuitry.

10. The system of claim 8, wherein said part of the digital TPMS analysis circuitry includes a harmonics analysis circuitry.

* * * * *